US006658355B2

(12) United States Patent
Miller et al.

(10) Patent No.: US 6,658,355 B2
(45) Date of Patent: Dec. 2, 2003

(54) METHOD AND APPARATUS FOR ACTIVATING A CRASH COUNTERMEASURE

(75) Inventors: Ronald Hugh Miller, Saline, MI (US); Irving Toivo Salmeen, Ann Arbor, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,589

(22) Filed: Jan. 23, 2002

(65) Prior Publication Data

US 2003/0191586 A1 Oct. 9, 2003

(51) Int. Cl.[7] .............................................. G06F 165/00

(52) U.S. Cl. ........................ 701/301; 701/207; 701/208; 340/436

(58) Field of Search ................................ 701/301, 207, 701/209, 211, 213; 340/436, 991, 995; 342/357.01, 357.06, 357.09; 455/502; 180/167

(56) References Cited

U.S. PATENT DOCUMENTS 5,068,654 A 11/1991 Husher ....................... 455/502
5,153,836 A 10/1992 Fraughton et al. .......... 701/301
5,325,302 A * 6/1994 Izidon et al. ............... 701/301
5,554,982 A 9/1996 Shirkey et al. ............. 340/903
5,872,526 A * 2/1999 Tognazzini ................. 340/961
5,907,293 A 5/1999 Tognazzini ................. 340/903
5,952,959 A 9/1999 Norris ................... 342/357.08
5,983,161 A 11/1999 Lemelson et al. .......... 701/301
5,999,880 A 12/1999 Okada et al. ............... 701/213
6,084,510 A 7/2000 Lemelson et al. .......... 340/539

* cited by examiner

*Primary Examiner*—Marthe Y. Marc-Coleman
(74) *Attorney, Agent, or Firm*—Frank A. MacKenzie

(57) ABSTRACT

A system for sensing a potential collision of a first vehicle (11) with a second vehicle (72) that transmits a second position signal. The first vehicle has a pre-crash sensing system (10) includes a memory (14) that stores vehicle data and generates a vehicle data signal. A first global positioning system (18) generates a first position signal corresponding to a position of the first vehicle. A first sensor (20) generating sensor data signals from the first vehicle. A receiver (22) receives a second position signal from the second vehicle. A countermeasure system (40) is also coupled within the first vehicle. A controller (12) is coupled to the memory (14), the global positioning receiver (18) the first sensor (20) and the counter measure system (40). The controller (12) determines a distance to the second vehicle in as a function of the second position signal. The controller determines a first vehicle trajectory from the vehicle data, the first sensor data signal and the position signal. The controller (12) determines a threat level as a function of the distance and the first vehicle trajectory and activates the counter-measure system in response to the threat level.

23 Claims, 4 Drawing Sheets

METHOD AND APPARATUS FOR ACTIVATING A CRASH COUNTERMEASURE

CROSS REFERENCE TO RELATED APPLICATIONS

The present invention is related to U.S. applications Ser. No. 09/683,603, filed Jan. 24, 2002, entitled "Method and Apparatus for Activating a Crash Countermeasure in Response to the Braking Capability of a Vehicle" and Ser. No. 09/683,588, filed Jan. 23, 2002, entitled "Method and Apparatus for Activating a Crash Countermeasure in Response to the Road Condition" filed simultaneously herewith and hereby incorporated by reference.

The present invention is related to U.S. Applications entitled "Method and Apparatus for Activating a Crash Countermeasure in Response to the Braking Capability of a Vehicle" and entitled "Method and Apparatus for Activating a Crash Countermeasure in Response to the Road Condition" filed simultaneously herewith and hereby incorporated by reference.

BACKGROUND OF THE INVENTION

Auto manufacturers are investigating radar, lidar, and vision-based pre-crash sensing systems to improve occupant safety. Current vehicles ty accelerometers that measure forces acting on the vehicle body. In response to accelerometers, airbags or other safety devices are employed. Also, Global Position Systems (GPS) systems are used in vehicles as part of navigation systems.

In certain crash situations, it would be desirable to provide information to the vehicle operator before forces actually act upon the vehicle. As mentioned above, known systems employ combinations of radar, lidar and vision systems to detect the presence of an object in front of the vehicle a predetermined time before an actual crash occurs.

Other systems broadcast their positions to other vehicles where the positions are displayed to the vehicle operator. The drawback to this system is that the driver is merely warned of the presence of a nearby vehicle without intervention. In a crowded traffic situation, it may be difficult for a vehicle operator to react to a crowded display.

It would be desirable to provide a system that takes into consideration the position of other vehicles and, should the situation warrant, provide crash mitigation.

SUMMARY OF THE INVENTION

The present invention provides an improved pre-crash sensing system that deploys a counter-measure in response to the position the object detected.

In one aspect of the invention, a system for sensing a potential collision of a first vehicle with a second vehicle that transmits a second position signal. The first vehicle has a pre-crash sensing system includes a memory that stores vehicle data and generates a vehicle data signal. A first global positioning system generates a first position signal corresponding to a position of the first vehicle. A first sensor generates sensor data signals from the first vehicle. A receiver receives a second position signal from the second vehicle. A countermeasure system is also coupled within the first vehicle. A controller is coupled to the memory, the global positioning receiver the first sensor and the counter measure system. The controller determines a distance to the second vehicle in as a function of the second position signal, determines a first vehicle trajectory from the sensor data signals and the position signal. The controller determines a threat level as a function of the distance and the first vehicle trajectory and activates the counter-measure system in response to the threat level.

In a further aspect of the invention, a method for operating a pre-crash sensing system for a first vehicle proximate a second vehicle a counter-measure system comprises: generating a vehicle data signal; generating a first position signal corresponding to a position of the first vehicle; generating sensor signals from the first vehicle; receiving a second position signal from the second vehicle; determining a distance to the second vehicle in as a function of the second position signal; determining a first vehicle trajectory from said vehicle data, said sensor signals and said position signal; determining a threat level as a function of the distance and said first vehicle trajectory; and activating a counter-measure system in response to the threat level.

Other aspects and features of the present invention will become apparent when viewed in light of the detailed description of the preferred embodiment when taken in conjunction with the attached drawings and appended claims.

DETAILED DESCRIPTION

Figure 1:
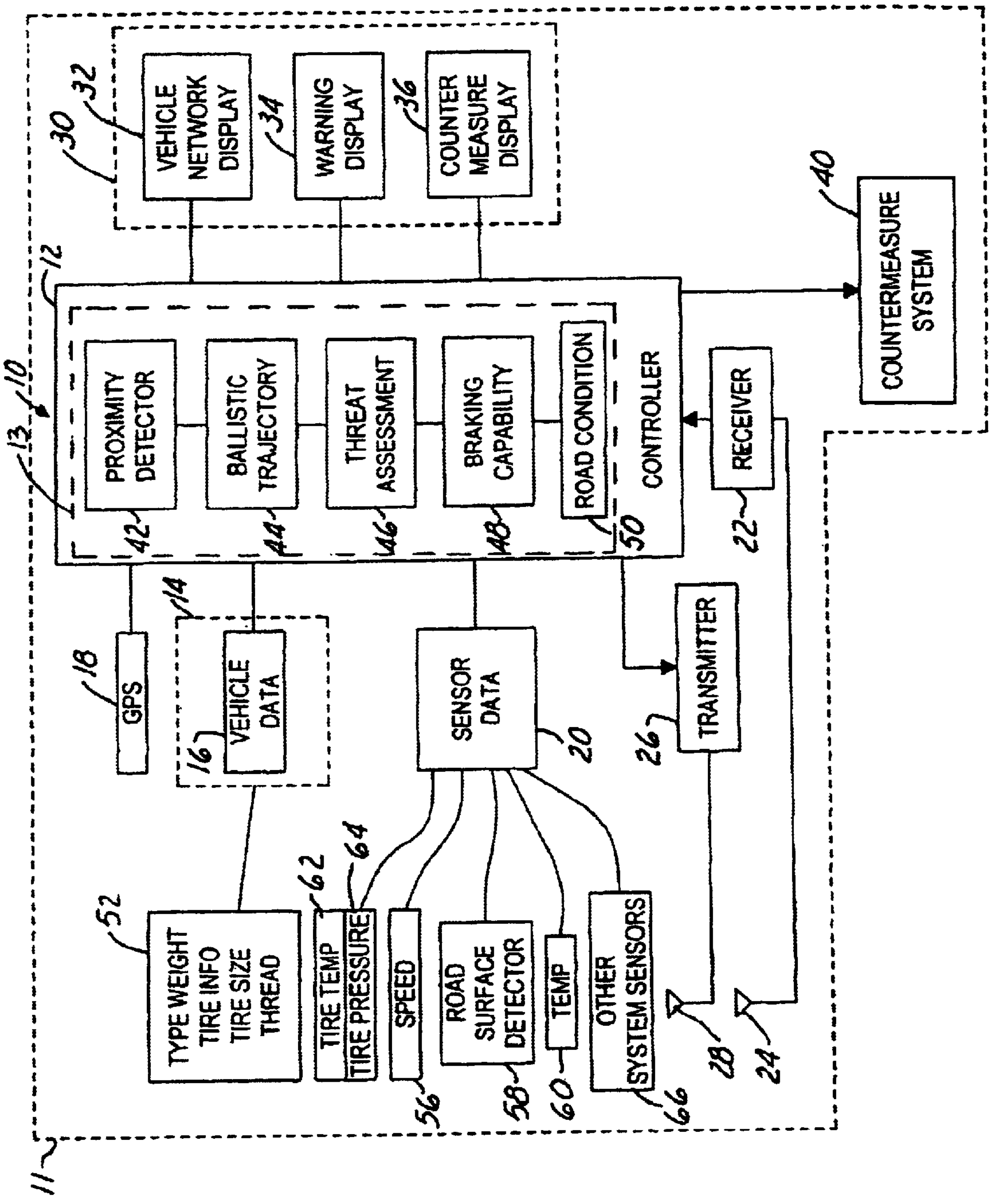
FIG. 1 is a block diagrammatic view of a pre-crash sensing system according to the present invention.

In the following figures the same reference numerals will be used to identify the same components in the various views.

Referring now to FIG. 1, a pre-crash sensing system 10 for an automotive vehicle 11 has a controller 12. Controller 12 is preferably a microprocessor-based controller that is coupled to a memory 14. Controller 12 has a CPU 13 that is programmed to perform various tasks. Memory 14 is illustrated as a separate component from that of controller 12. However, those skilled in the art will recognize that memory may be incorporated into controller 12.

Memory 14 may comprise various types of memory including read only memory, random access memory, electrically erasable programmable read only memory, and keep alive memory. Memory 14 is used to store various thresholds and parameters including vehicle data 16 as illustrated.

Controller 12 is coupled to a global positioning system 18 that receives position data triangulated from satellites as is known to those skilled in the art.

Controller 12 is coupled to a sensor data block 20 that represents various sensors located throughout the vehicle. The various sensors will be further described below.

Controller 12 may also be coupled to a receiver 22 coupled to a receiving antenna 24 and a transmitter 26 coupled to a transmitting antenna 28.

Controller 12 is also coupled to a display 30 that may include various types of displays including a vehicle network display, a warning display 34, and a counter-measure display 36. Each of these displays will be described in further detail below. As should be noted, display 30 may be a single display with different display features or may be individual displays that may include audible warnings as well.

Controller 12 has various functional blocks illustrated within CPU 13. Although these functional blocks may be represented in software, they may also be illustrated in hardware. As will be further described below, controller 12 has a proximity detector 42 that is used to determine the proximity of the various vehicles around automotive vehicle 11. A vehicle trajectory block 44 is used to determine the trajectory of the vehicle and surrounding vehicles. Based upon the vehicle trajectory block 44, a threat assessment is made in functional block 46. Of course, threat assessment 46 takes into consideration various vehicle data 16 and sensor data from sensor block 20. Threat assessment 46 may be made based upon the braking capability of the present vehicle and surrounding vehicles in block 48 and also road conditions of the present vehicle and surrounding vehicles in block 50. As will be further described below, the road conditions of block 50 may be used to determine the braking capability in block 48.

In block 16, various vehicle data are stored within the memory. Vehicle data represents data that does not change rapidly during operation and thus can be fixed into memory. Various information may change only infrequently and thus may also be fixed into memory 14. Vehicle data includes but is not limited to the vehicle type, which may be determined from the vehicle identification number, the weight of the vehicle and various types of tire information. Tire information may include the tire and type of tread. Such data may be loaded initially during vehicle build and may then manually be updated by a service technician should information such as the tire information change.

Global positioning system (GPS) 18 generates a position signal for the vehicle 11. Global positioning system 18 updates its position at a predetermined interval. Typical interval update periods may, for example, be one second. Although this interval may seem long compared to a crash event, the vehicle position may be determined based upon the last up update from the GPS and velocity and acceleration information measured within the vehicle.

Sensor data 20 may be coupled to various sensors used in various systems within vehicle 11. Sensor data 20 may include a speed sensor 56 that determines the speed of the vehicle. Speed sensor may for example be a speed sensor used in an anti-lock brake system. Such sensors are typically comprised of a toothed wheel from which the speed of each wheel can be determined. The speed of each wheel is then averaged to determine the vehicle speed. Of course, those skilled in the art will recognize that the vehicle acceleration can be determined directly from the change in speed of the vehicle. A road surface detector 58 may also be used as part of sensor data 20. Road surface detector 58 may be a millimeter radar that is used to measure the road condition. Road surface detector 58 may also be a detector that uses information from an anti-lock brake system or control system. For example, slight accelerations of the wheel due to slippage may be used to determine the road condition. For example, road conditions such as black ice, snow, slippery or wet surfaces may be determined. By averaging microaccelerations of each tire combined with information such as exterior temperature through temperature sensor 60, slippage can be determined and therefore the road conditions may be inferred therefrom. Such information may be displayed to the driver of the vehicle. The surface conditions may also be transmitted to other vehicles.

Vehicle data 16 has a block 52 coupled thereto representing the information stored therein. Examples of vehicle data include the type, weight, tire information, tire size and tread. Of course, other information may be stored therein.

Sensor data 20 may also include a tire temperature sensor 62 and a tire pressure sensor 64. The road condition and the braking capability of the vehicle may be determined therefrom.

Other system sensors 66 may generate sensor data 20 including steering wheel angle sensor, lateral acceleration sensor, longitudinal acceleration sensor, gyroscopic sensors and other types of sensors.

Figure 2:
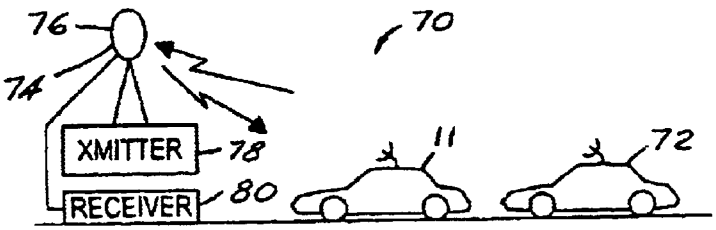
FIG. 2 is a block diagrammatic view of one embodiment of the invention illustrating a vehicle network established by two pre-crash sensing systems.

Referring now to FIG. 2, vehicle 11 may be part of a network 70 in conjunction with a second vehicle or various numbers of vehicles represented by reference numeral 72. Vehicle 72 preferably is configured in a similar manner to that of vehicle 11 shown in FIG. 1. Vehicle 72 may communicate directly with vehicle 11 through transmitter 26' and receiver 22' to form a wireless local area network. The network 70 may also include a repeater 74 through which vehicle 11 and vehicle 72 may communicate. Repeater 74 has an antenna 76 coupled to a transmitter 78 and a receiver 80. Various information can be communicated through network 70. For example, vehicle data, position data, and sensor data may all be transmitted to other vehicles throughout network 70.

Figure 3:
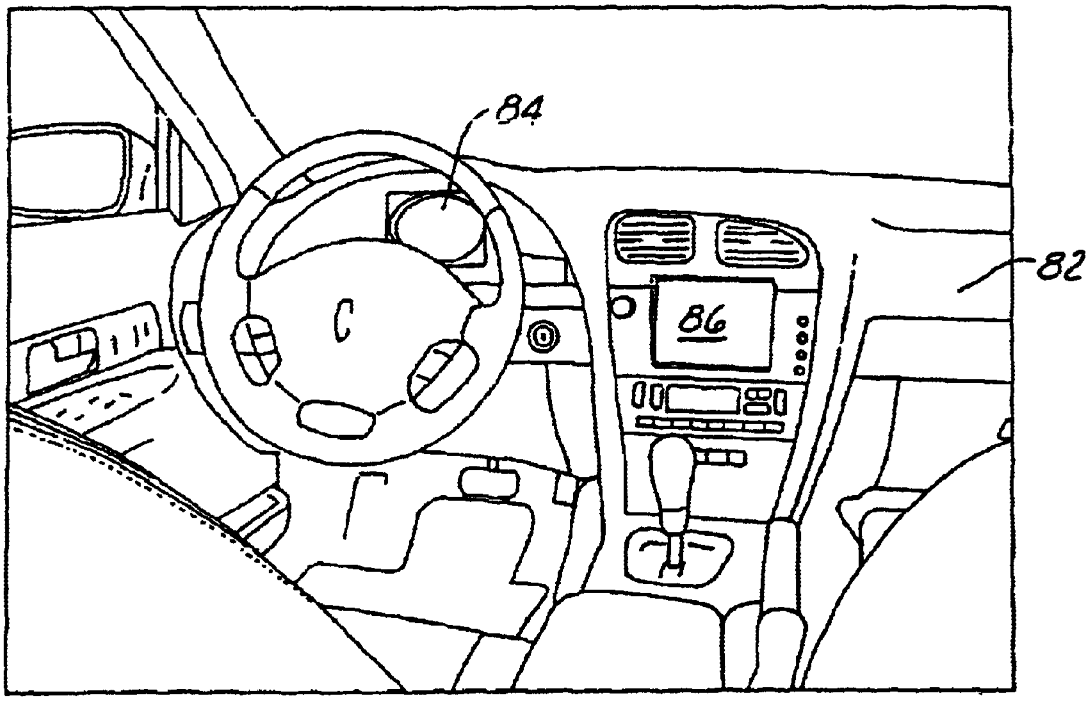
FIG. 3 is a perspective view of an automotive vehicle instrument panel display for use with the present invention.

Referring now to FIG. 3, an instrument panel 82 is illustrated having a first display 84 and a second display 86. Either displays 84, 86 may be used generate various information related to the pre-crash sensing system.

Figure 4:
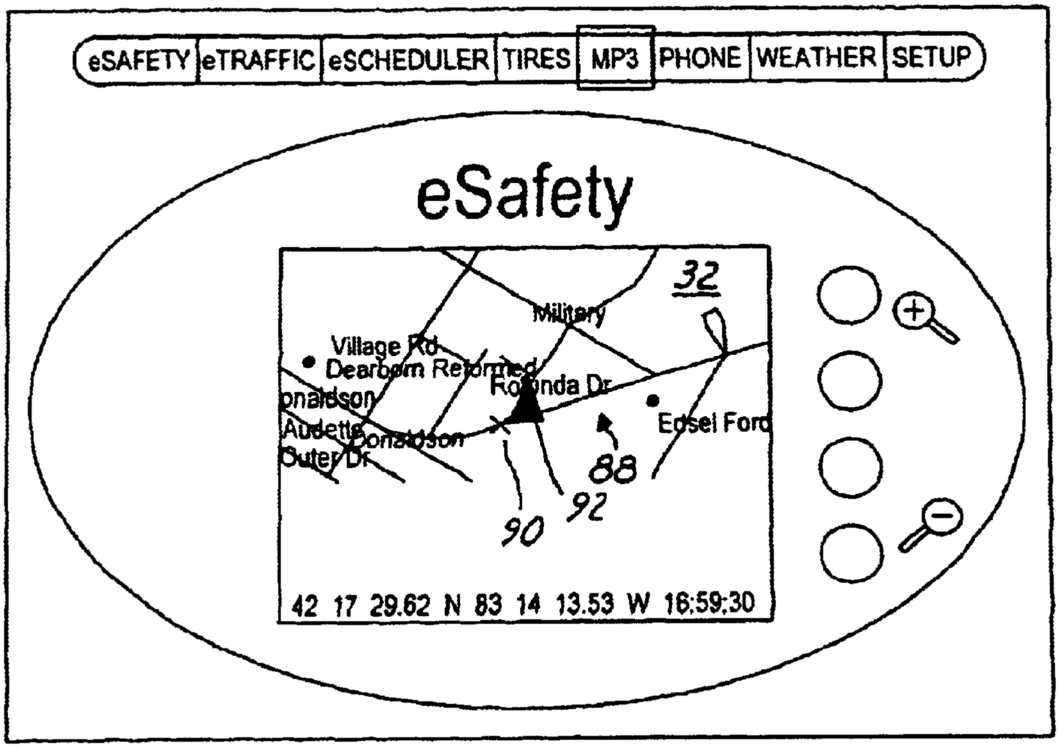
FIG. 4 is a front view of a vehicle network display according to the present invention.

Referring now to FIG. 4, display 84 is illustrated in further detail. Display 84 corresponds to the vehicle network display 32 mentioned above. The vehicle network display 32 may include a map 88, a first vehicle indicator 90, and a second vehicle indicator 92. First vehicle indicator corresponds to the vehicle in which the pre-crash sensing system is while vehicle indicator 92 corresponds to an approaching vehicle. Vehicle network display 32 may be displayed when a vehicle is near but beyond a certain distance or threat level.

Figure 5:
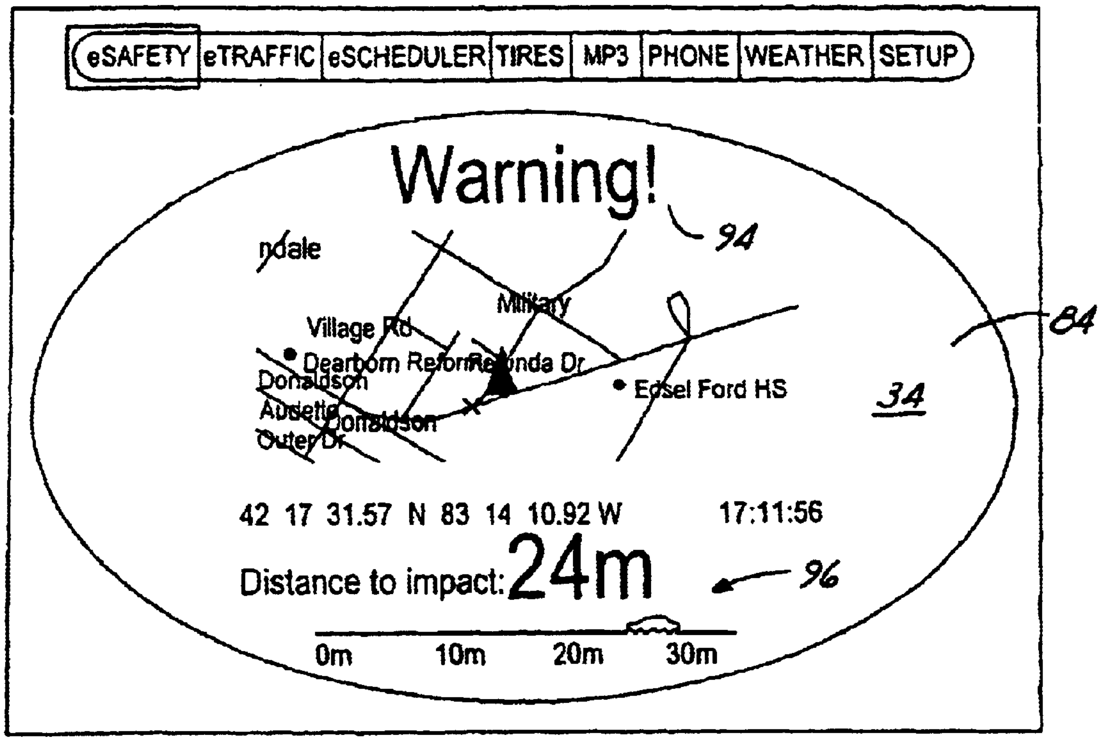
FIG. 5 is a front view of a warning display according to the present invention.

Referring now to FIG. 5, display 84 showing a warning display 34 is illustrated. Warning display 34 in addition to the display information shown in vehicle network display in FIG. 3, includes a warning indicator 94 and a distance indicator 96. Distance indicator 96 provides the vehicle operator with an indication of the distance from a vehicle. The warning display 34 may be indicated when the vehicle is within a predetermined distance or threat level more urgent than that of vehicle network display 32 of FIG. 3.

Figure 6:
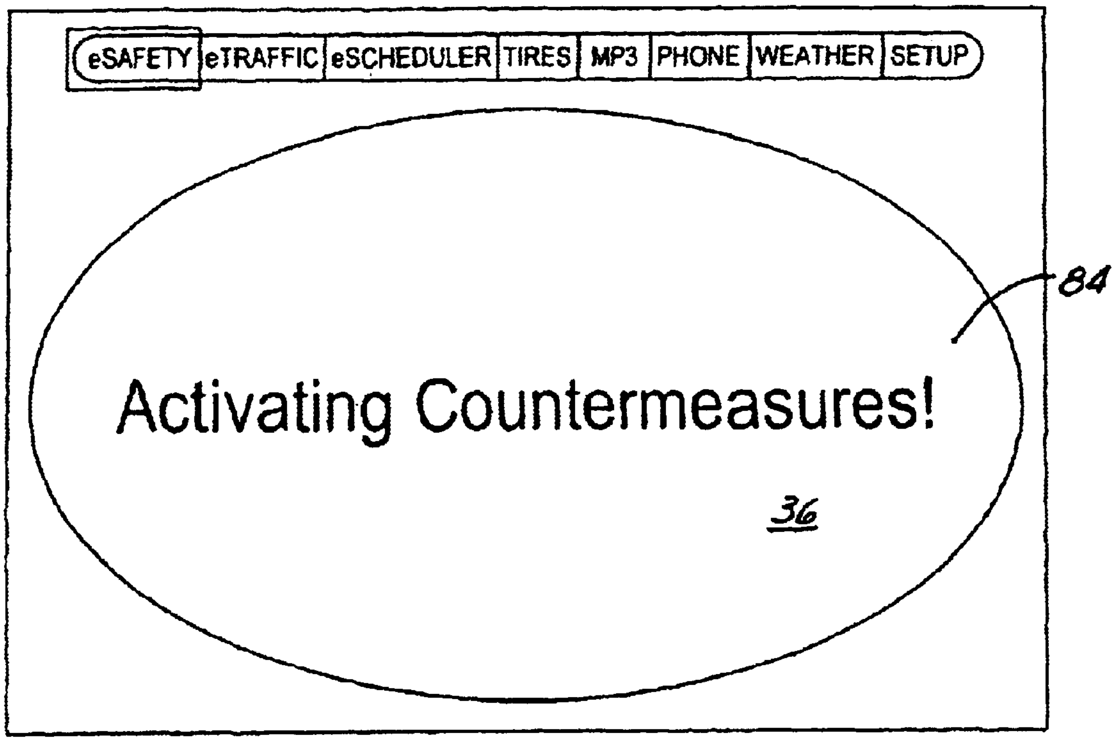
FIG. 6 is a counter-measure display according to the present invention.

Referring now to FIG. 6, vehicle display 84 changes to a counter-measure display 36 to indicate to the vehicle operator that a counter-measure is being activated because the threat level is high or the distance from the vehicle is within a predetermined distance less than the distances needed for activation of displays shown in FIGS. 3 and 4.

Figure 7:
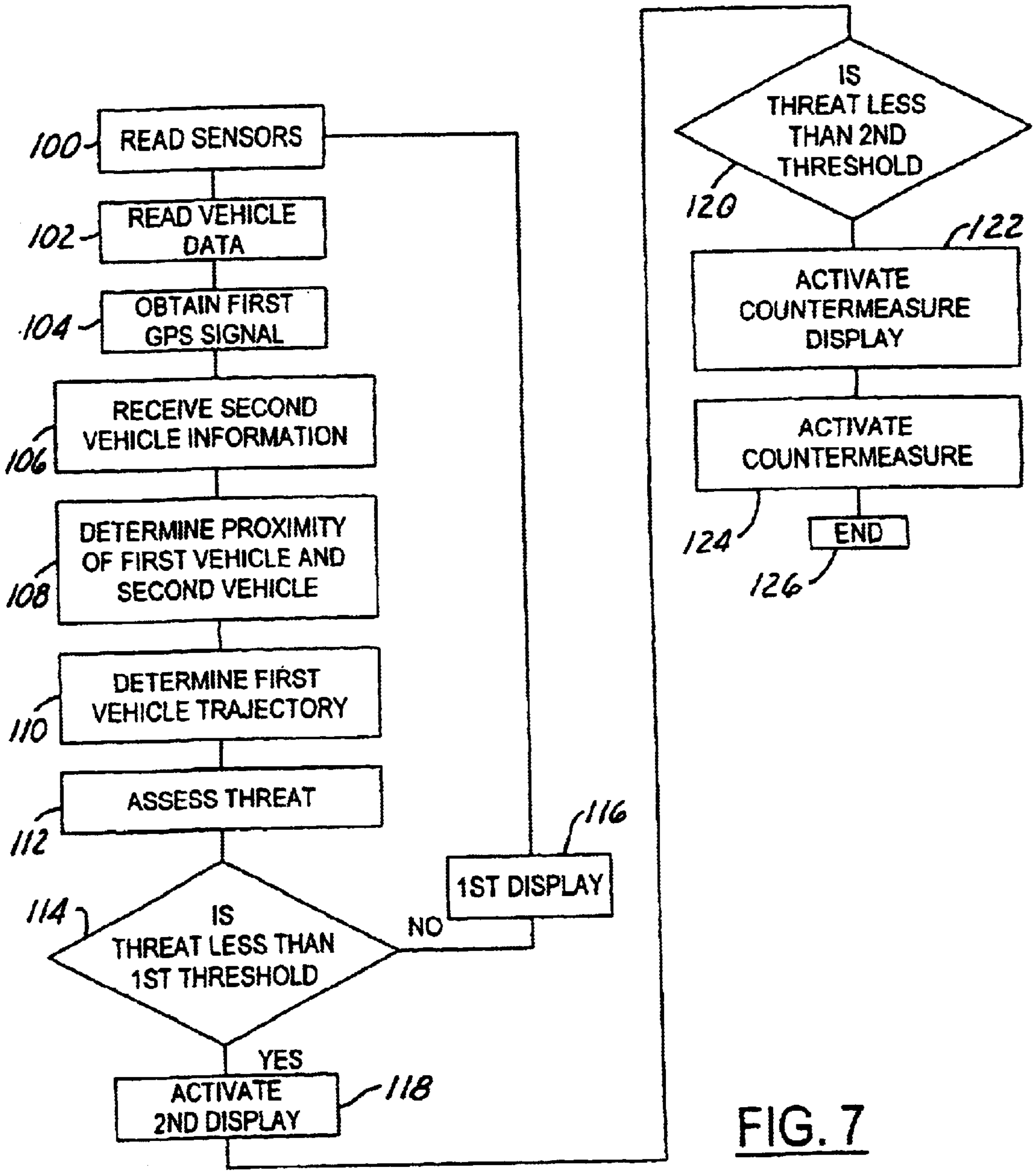
FIG. 7 is a flow chart of the operation of a pre-crash sensing system according to the present invention.

Referring now to FIG. 7, a method for operating the pre-crash sensing system is described. In step 100, the various sensors for the system are read. In step 102, various vehicle data is read. In step 104, a first global positioning signal is obtained for the vehicle. In step 106, the information from a second vehicle is obtained. The second vehicle information may be various information such as the speed, heading, vehicle type, position, and road conditions from the other vehicles or vehicle in the network. In step 108, the proximity of the first vehicle and second vehicle is determined. The proximity is merely a distance calculation. In step 110, the first vehicle trajectory relative to the second vehicle is determined. The first vehicle trajectory uses the information such as the positions and various sensors to predict a path for the first vehicle and the second vehicle. In step 112, the threat of the first vehicle trajectory relative to the second vehicle is determined. For example, when the first vehicle may collide with the second vehicle, a threat may be indicated. The threat is preferably scaled to provide various types of warning to the vehicle. Threat assessment may be made based upon conditions of the vehicle trajectory and vehicle type as well as based upon tire information which may provide indication as to the braking capability of the first vehicle and/or the second vehicle. Thus, the threat may be adjusted accordingly. Also, the road surface condition may also be factored into the threat assessment. On clear dry roads a threat may not be as imminent as if the vehicle is operating under the same conditions with wet or snowy roads. In the previous blocks, it should be noted that the system is not activated until a vehicle is within a predetermined distance. The threat assessment, it should be noted, is based on a ballistic trajectory such as that described in 44 above in FIG. 1. If the threat is not less than a predetermined threshold or the distance is greater than the predetermined threshold, a first display is presented to the driver in step 116. The first display generated in step 116 may, for example, correspond to the vehicle network display shown in FIG. 3. If the threat is less than a first threshold, then a second display such as warning display 34 shown in FIG. 4 may be generated in step 118. Step 118 may for example be presented to the driver when the vehicle is within a predetermined distance from the first vehicle. In step 120, if the threat is not less than a second threshold step 100 is performed. If the threat is less than a second threshold or the second vehicle is closer to the first vehicle (below the second threshold), then a counter-measure display 36 such as that shown in FIG. 6 may be presented to the vehicle operator in step 122. The counter-measure may also then be activated in step 124. Various counter-measures may include front or side airbag deployment, activating the brakes to lower the front bumper height, steering or braking activations.

As would be evident to those skilled in the art, various permutations and modifications to the above method may be performed. For example, a system in which the road condition and position of the second vehicle may be used to activate a counter-measure system may be employed. Likewise, the second vehicle position relative to the first vehicle and the road condition at the second vehicle may also be displayed to the vehicle operator. Likewise, the threat assessment may also be adjusted according to the road condition.

Another embodiment of the present invention includes activating the countermeasure system in response to the braking capability of surrounding vehicles. By factoring in the braking capability of surrounding vehicles, threat assessment levels may be adjusted accordingly. Likewise, the braking capability of the first vehicle may also be used in the threat assessment level. Likewise, the displays may also be updated based upon the braking capabilities of the nearby vehicles. The braking capabilities may be determined from various tire type, size, tread, tire pressure, tire temperature, outside temperature as well as the road condition.

Advantageously, by connecting the vehicles through the network, various information may be known to drivers of other nearby vehicles. For example, the presence of black ice and other slippery conditions not readily apparent may be transmitted to other vehicles for avoidance thereof.

While particular embodiments of the invention have been shown and described, numerous variations and alternate embodiments will occur to those skilled in the art. Accordingly, it is intended that the invention be limited only in terms of the appended claims.

What is claimed is:

1. A method for operating a pre-crash sensing system for a first vehicle proximate a second vehicle a counter-measure system comprising:

generating a vehicle data signal;

generating a first position signal corresponding to a position of the first vehicle;

generating sensor signals from the first vehicle;

receiving a second position signal from the second vehicle;

determining a distance to the second vehicle in as a function of the second position signal;

determining a first vehicle trajectory from said vehicle data, said sensor signals and said position signal;

determining a threat level as a function of the distance and said first vehicle trajectory; and activating a counter-measure system in response to the threat level.

2. A method as recited in claim 1 wherein generating a vehicle data signal comprises generating a vehicle type signal, a vehicle weight signal or a vehicle size signal.

3. A method as recited in claim 1 wherein generating a first position signal corresponding to a position of the first vehicle comprises generating the first position signal corresponding to a position of the first vehicle from a global positioning system.

4. A method as recited in claim 3 wherein generating the first position signal corresponding to a position of the first vehicle from a global positioning system comprises generating an update signal at a predetermined interval from the global position system and generating a first position signal during said interval as a function of said update signal and speed and acceleration.

5. A method as recited in claim 1 wherein generating sensor signals from the first vehicle comprises generating a speed sensor signal, a yaw rate sensor signal, a steering wheel angle signal or a lateral acceleration signal.

6. A method as recited in claim 1 wherein receiving a second position signal from the second vehicle comprises receiving the second position signal in response to a global positioning system.

7. A method as recited in claim 1 wherein receiving a second position signal from the second vehicle comprises receiving the second position signal directly from the second vehicle.

8. A method as recited in claim 1 wherein receiving a second position signal from the second vehicle comprises receiving the second position signal from a repeater station.

9. A method as recited in claim 1 wherein activating the counter-measure comprises deploying and airbag or changing a bumper height.

10. A method as recited in claims 9 further comprising when the distance is below a first threshold and above a second threshold, activating a second display.

11. A method as recited in claim 9 further comprising when the distance is below a second threshold, activating a third display.

12. A method as recited in claim 9 further comprising when the distance is below a second threshold, activating a counter-measure system.

13. A method as recited in claim 9 wherein generating a vehicle data signal comprises generating a vehicle type signal, a vehicle weight signal or a vehicle size signal.

14. A method as recited in claim 9 wherein generating a first position signal corresponding to a position of the first vehicle comprises generating the first position signal corresponding to a position of the first vehicle from a global positioning system.

15. A method for operating a pre-crash sensing system for a first vehicle proximate a second vehicle a counter-measure system comprising:

generating a vehicle data signal;

generating first position signal corresponding to a position of the first vehicle;

generating sensor signals from the first vehicle;

receiving a second position signal from the second vehicle;

determining a distance to the second vehicle in as a function of the second position signal;

determining a first vehicle trajectory from said vehicle data, said sensor signals and said position signal;

when the distance is greater than a first threshold activating a first display; and when the distance is less than the fist threshold, activating a counter-measure system.

16. A method as recited in claim 15 further comprising activating a second display when the distance is below the first threshold.

17. A method as recited in claim 15 wherein receiving a second position signal from the second vehicle comprises receiving the second position signal in response to a global positioning system.

18. A method as recited in claim 15 wherein receiving a second position signal from the second vehicle comprises receiving the second position signal directly from the second vehicle.

19. A method as recited in claim 15 wherein receiving a second position signal from the second vehicle comprises receiving the second position signal from a repeater station.

20. A system for sensing a potential collision of a first vehicle with a second vehicle that transmits a second position signal, said first vehicle having a pre-crash sensing system comprising:

a memory storing vehicle data generating a vehicle data signal;

a first global positioning system generating a first position signal corresponding to a position of the first vehicle;

a first sensor generating sensor data signals from the first vehicle;

a receiver receiving a second position signal from the second vehicle;

a countermeasure system;

a controller coupled to said memory, said global positioning receiver, said first sensor and said counter measure system, said controller determining a distance to the second vehicle in as a function of the second position signal, determining a first vehicle trajectory from said sensor data, said sensor data signals and said position signal, said controller determining a threat level as a function of the distance and said first vehicle trajectory, and activating the counter-measure system in response to the threat level.

21. A system as recited in claim 20 further comprising a first display coupled to said controller for displaying information in response to a first threat level.

22. A system as recited in claim 20 further comprising a second display coupled to said controller for displaying second information in response to a second threat level.

23. A system as recited in claim 20 further comprising a third display coupled to said controller for displaying third display information in response to a third threat level corresponding to an activated counter-measure.

* * * * *